March 18, 1952 H V. HOBBS ET AL 2,589,695
EDUCATIONAL DEVICE
Filed Nov. 6, 1950 3 Sheets-Sheet 1

INVENTORS
H. VON HOBBS
DOROTHY DELL HOBBS
BY Edward N. Weinart
ATTORNEY

March 18, 1952     H V. HOBBS ET AL     2,589,695
EDUCATIONAL DEVICE
Filed Nov. 6, 1950     3 Sheets-Sheet 2

INVENTORS
H. VON HOBBS
DOROTHY DELL HOBBS
BY Edward W. Weinert
ATTORNEY

March 18, 1952     H V. HOBBS ET AL     2,589,695
EDUCATIONAL DEVICE

Filed Nov. 6, 1950     3 Sheets-Sheet 3

INVENTORS
H. VON HOBBS
DOROTHY DELL HOBBS
BY Edward W. Weimer
ATTORNEY

Patented Mar. 18, 1952

2,589,695

UNITED STATES PATENT OFFICE 2,589,695

EDUCATIONAL DEVICE

H Von Hobbs and Dorothy Dell Hobbs, Crown Point, Ind.

Application November 6, 1950, Serial No. 194,275

8 Claims. (Cl. 35—48)

This invention relates to an educational device adapted for a wide variety of uses, but primarily designed for use in connection with the instruction of children and concerns itself primarily with an apparatus having a vertically extending rack for sustaining a roll of paper containing the questions to be answered with space adjacent each question for the child's or student's answer together with key controlled means in a horizontal position for manipulation by the child or student for recording its or his answer in the answer space.

It is an object of this invention to provide such a device which will make the pupil alert, think quickly and learn to coordinate its senses of sight, hearing and feeling, and efficiently use the same.

It is further an object of this invention to provide such a device which will cause a pupil to exercise its visual, mental and physical faculties in co-ordination.

The invention is designed for the instruction of a wide variety of subjects to pupils and students of various ages and may also find utility in railway stations or brokerage houses or the like where changing information is necessary or desired.

The invention comprises the novel structure and combination of parts hereinafter described and more particularly pointed out and defined in the appended claims.

In the accompanying drawing which illustrates a preferred form of this invention and in which similar reference characters refer to similar features in the different views.

Figure 1:
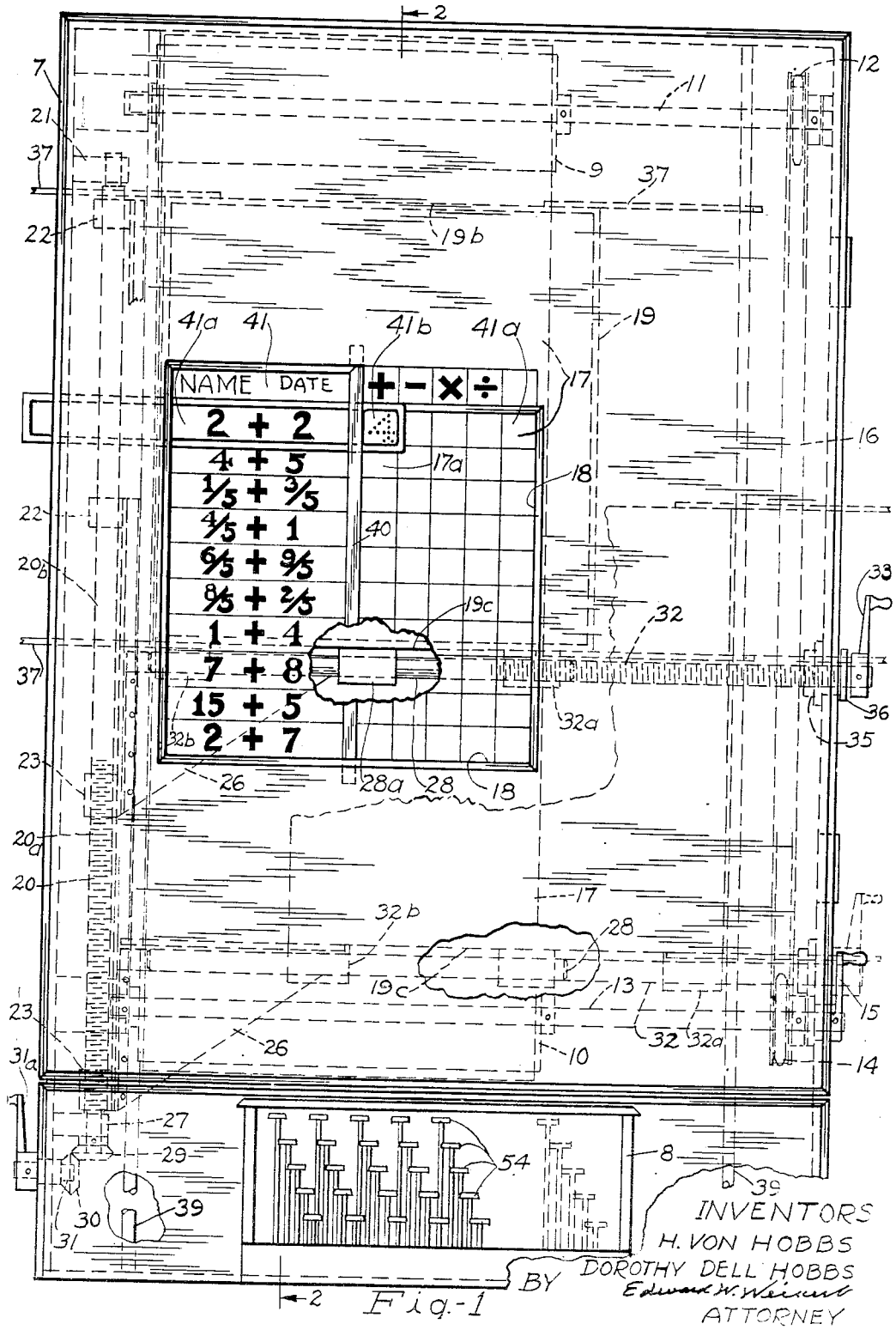
Fig. 1 is a front elevational view of an educational device involving this invention.

In referring now to the drawing, there is shown a casing 7 adapted to be positioned in upright or vertical position, preferably against a wall for supporting a question and answer sheet and an auxiliary casing 8 at the bottom in a horizontal position for containing the keys for typing the answers. Within the casing 7 there are a pair of spaced reels 9 and 10. The reel 9 is secured to a shaft 11 suitably journalled in the casing and having a sprocket gear 12 adjacent its outer end. The reel 10 is secured to a shaft 13 suitably journalled in the casing 7 and having a sprocket gear 14 adjacent its outer end. The shaft 13 extends beyond the outer side of the casing and carries an operating crank 15. A sprocket chain 16 connects the gears 12 and 14 for conjoint rotation through the operation of crank 15. A long sheet of writing paper 17 is supported upon the reels 9 and 10, which, it will be noted, are located one near the top and the other near the bottom of the casing. The span of paper between the reels is exposed through a window or opening 18 in the front wall.

A vertically and laterally shiftable slide frame 19 is supported in the casing with its front wall 19a just inside the span of paper so that it can serve as a writing table, and having a central opening 19g to receive the answer writing means as will later appear. The frame or auxiliary casing 19 has a top wall 19b, a bottom wall 19c, a suitably slotted rear wall 19d, and end walls 19e and 19f. Adjacent the left hand side of the casing, there is a vertical screw shaft 20 which is journalled at its upper end in a bearing 21 on the casing and at its lower end in a bearing 27 on the casing. This shaft has a lower threaded portion 20a and an upper smooth portion 20b. A nut 22 is slidably mounted upon the smooth portion 20b and a nut 23 is threaded upon the threaded portion. A suitable support, which may be in the form of an angle bar 25, is secured to the nuts 22 and 23, and a gusset plate 26 is secured to the angle bar 25. The gusset plate 26 is welded or secured to a horizontal rod 28 which slidably extends into a hollow bearing 28a upon the bottom of the frame 19 for supporting said frame or auxiliary casing 19. The shaft 20 extends below the bearing 27 and carries a bevel gear 29 which meshes with a bevel gear 30 on a shaft 31 extending through the main casing and carrying an operating crank 31a. Operation of crank 31a will raise or lower the auxiliary casing as indicated in dotted lines in Fig. 1.

Figures 2, 3:
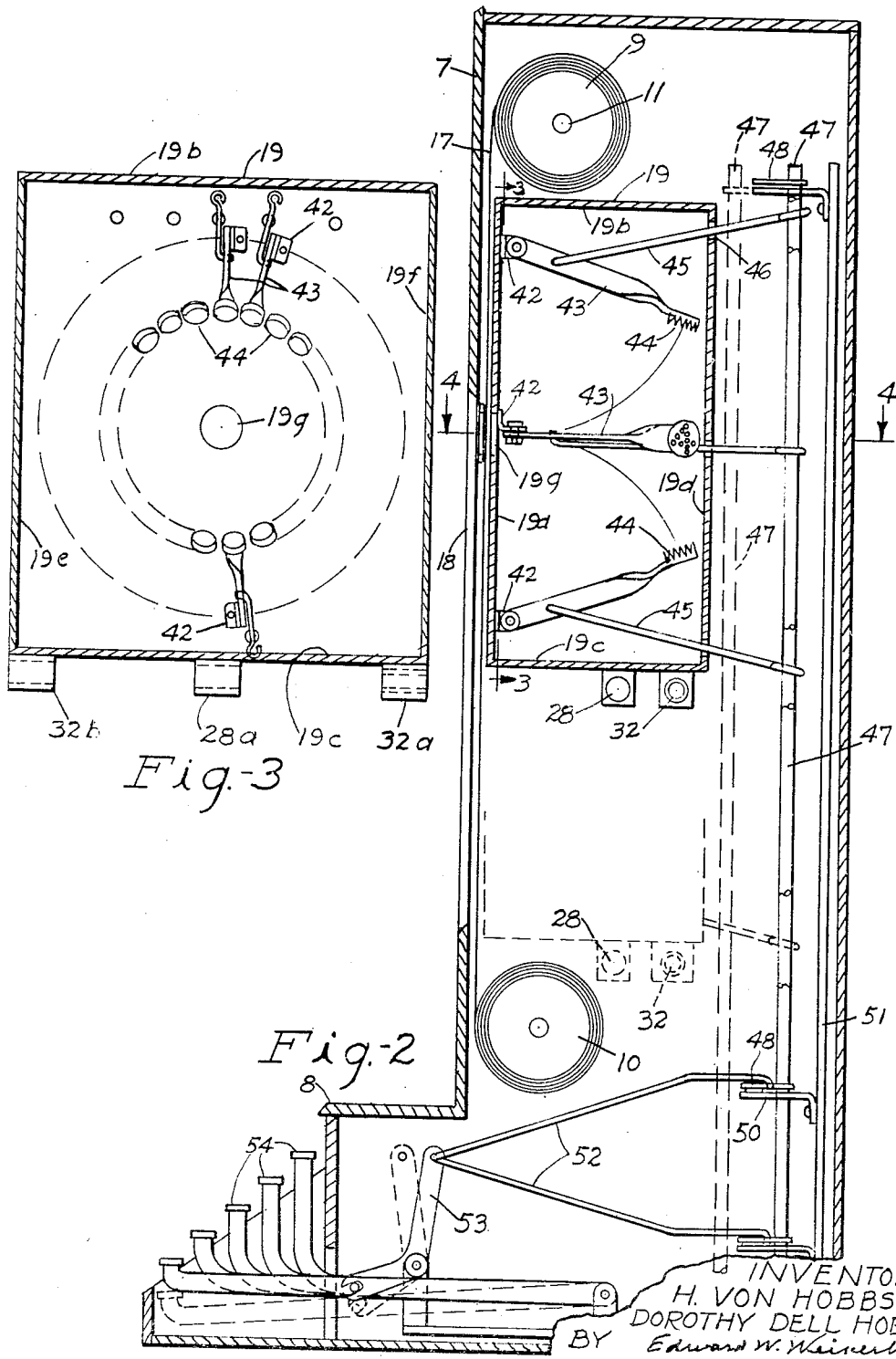
Fig. 2 is a sectional view of the same taken substantially upon the line 2—2 of Fig. 1 looking in the direction of the arrows.
Fig. 3 is a fragmentary sectional view taken substantially upon the line 3—3 of Fig. 2 looking in the direction of the arrows.
Figures 4, 5, 6:
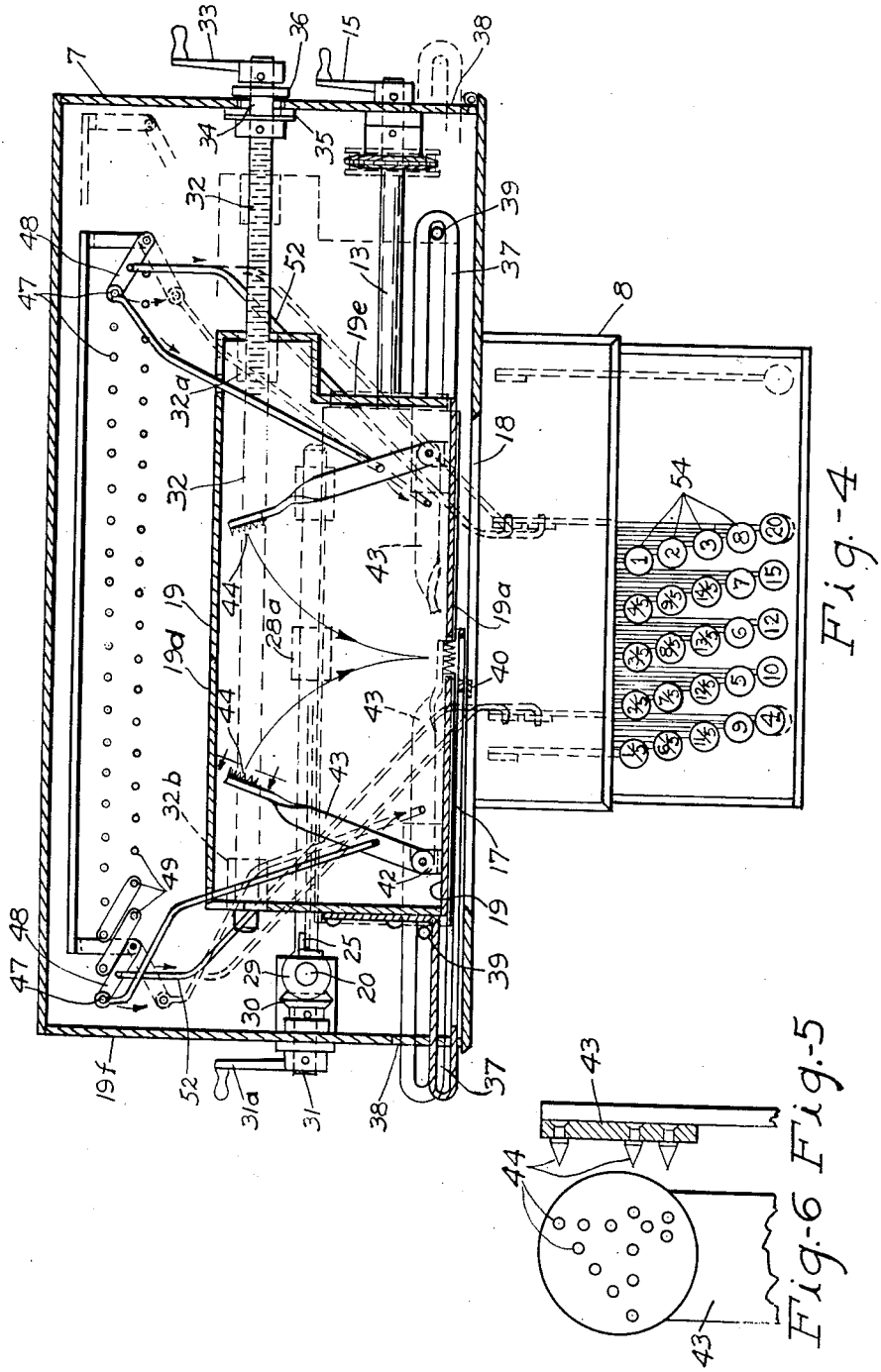
Fig. 4 is a part sectional and part elevational view taken upon the line 4—4 of Fig. 2 looking in the direction of the arrows.
Fig. 5 is a fragmentary detail view partly in section illustrating the perforating or marking device.
Fig. 6 is a front elevational view of Fig. 5.

The slide frame or auxiliary casing 19 is also adapted for lateral shifting movements through the instrumentality of a screw shaft 32 which has a threaded relation with a suitable threaded bearing 32a upon the bottom of casing 19 and a smooth sliding relation with a smooth bearing 32b on frame 19 (Fig. 3). The shaft 32 extends through a vertical slot 34 in the end wall of the main casing 7 as shown in Fig. 4 and carries an operating crank 33 upon its outer end. Bearing collars 35 and 36 are secured upon the shaft 32, one upon each side of the casing wall, however with sufficient tolerance to allow the shaft to slide vertically in the slot 34 which is of sufficient extent to allow the auxiliary casing 19 to be lowered into dotted line position (Fig. 1) or elevated into dotted line position as shown also in Fig. 1. By rotating the crank 33, the auxiliary casing can be shifted upon rod 28 in a lateral direction to and from the right hand side of the main casing.

In order to guide and stabilize the auxiliary casing 19, especially in its movements, it is provided with closed guide ways 37 extending from its end walls (Figs. 1 and 4) adjacent its front portion which may extend through slots 38 in the main casing and which encompass vertical guide rolls 39 secured in the main casing. In order to hold the slide frame in the casing, a vertical strip 40 extends over an intermediate portion of the opening or window 18 in the main casing. This strip 40 also forms the dividing line between the question and answer spaces on the writing sheet 17 as will later more fully appear.

The slide frame 19 carries a question and answer enclosing form 41 (Fig. 1) which is shown as oblong and rectangular and as having a question space 41a upon one side of the guide strip 40 and an answer space 41b upon the other side of the guide strip 40. Of course, the answer spaces will vary in width as the slide casing is laterally adjusted. However, the answer space 41a will remain substantially constant since it projects on one side of the opening 18 a distance equal to about the maximum shiftable distance of the auxiliary casing 19. It will be understood that the question will be written on the paper sheet 17 upon the left hand side of the guide strip 40 and the answer will be made upon the other or right hand side of the guide strip 40 in alignment with the question; the form 41 providing the means for obtaining such alignment. By shifting the auxiliary casing to the right in Fig. 1, the answer space can be increased according to the requirements of the answer.

In the present instance, the answers are designed to be made through perforating means entering opening 19g which will now be set forth. Upon the interior of the front wall 19a of the slide casing 19, there is a circular series of bearing clips 42 upon which arms 43 are pivoted which can be swung to strike substantially the same area over the opening 19g. In the present instances, there are twenty-five arms 43, the ends of which carry perforating pins 44. The pins are arranged to form perforations denoting a number or other designating means such as alphabets if desired; the perforating pins being merely illustrative of one form of designating means.

Each arm 43 is pivotally connected intermediate its length to one end of a link 45 which extends through suitable slots 46 in the wall of the auxiliary casing 19, and is pivotally connected to a rod 47 which is pivotally carried by the ends of spaced links 48; the free end of links 48 being pivoted to stationary supports 50 extending from a rod 51 fixed in the main casing. A key operated link 52 is pivotally connected to the intermediate portion of each link 48. The links 52 are suitably bent or formed to connect at their free ends with key operated levers 53 which in turn are actuated by keys 54. The actuation of a key 54 will operate the lever 53 connected thereto, and lever 53 will in turn actuate link 52 connected thereto and link 52 will swing rod 47 from full line position to dotted line position and cause link 45 to swing its arm 43 down to dotted line position for perforating the sheet through opening 19g.

In use, the question will be written on the exposed portion of the paper sheet in the window of the casing 7 to the left of the guide rod 40. In the present instance, a lesson in arithmetic is illustrated and two vertical rows of numbers or fractions are shown on the exposed part of the sheet 17 which are to be added by the pupil and the answer placed in the first column 17a on the sheet. To do this, the pupil will mentally add the first two figures which gives the sum of 4, he will then actuate the proper key and cause the sum to be entered in the proper column 17a by perforating a sheet through opening 19g. The slide casing may then be lowered one space so that the second row of numbers, in this instance 4 and 3, are in the form 41 and the addition repeated. If more than one column is required for an answer, the slide casing 19 may be laterally shifted by means of the screw rod 32.

The paper sheet with the questions and answers may be kept as a record to check the grade or marks of a pupil whose name appears on the sheet with the date and will save time and energy for the teacher when the device is used in school work. The device may also be used in railroad stations to serve as a train bulletin or in brokage houses or the like.

The device, however, is best adapted for an educational device since it tends to make the pupil think quickly and co-ordinate the visual, mental and physical senses. It also tends to make the pupils more alert.

We are aware that many changes may be made and various details of construction may be modified without departing from the principles of this invention, so we do not propose limiting the patent granted otherwise than necessitated by the appended claims.

We claim:

1. In a device of the class described, an upright casing having a front wall with an opening, a writing sheet supported in said casing for movement with respect to said opening, an auxiliary casing within said upright casing having a front wall normally adjacent said sheet and having a sheet perforating aperture, means for shifting said auxiliary casing, a sheet perforating arm pivoted upon said auxiliary casing and adapted for perforating said sheet through said aperture and manually operable means for operating said arm.

2. In a device of the class described, an upright casing having an opening in its front wall, a writing sheet supported in said casing for movement over said opening for receiving questions and answers, an auxiliary casing in said upright casing rearward of said sheet and having a question and answer enclosing form, means for supporting said auxiliary casing for vertical and lateral movements for varying the position of said question and answer form with respect to said sheet, and key controlled means for forming answers on said sheet in a portion of said form.

3. In a device of the class described, a main casing having a front wall with an opening, a writing sheet supported in said casing for movement over said opening for receiving answers to questions thereon, an auxiliary casing rearward of said sheet, means for supporting said auxiliary casing for vertical and lateral movements with respect to said opening, means for vertically shifting said auxiliary casing, said auxiliary casing having a front wall with a substantially central opening adjacent said sheet and key controlled means mounted interiorly of said front wall for perforating said sheet through said central opening.

4. In a device of the class described, an upright casing having an opening in its front, a writing sheet supported in said casing and movable over said opening for receiving questions and answers, an auxiliary casing in said upright casing having a front wall adjacent said writing paper with an opening, answer forming arms pivoted interiorly of the front wall, operating keys and means connecting said arms and keys whereby operation of said keys will cause said arms to swing against said front wall and form the answer upon said sheet through said second mentioned opening.

5. In a device of the class described, an upright casing having an opening in its front wall, a writing sheet supported in said casing for movement over said opening, an auxiliary casing in said upright casing rearward of said sheet, means for supporting said auxiliary casing for vertical and lateral movements over said opening, said auxiliary casing having a front wall with an opening adjacent said sheet, a circular series of arms pivoted interiorly of the front wall of said auxiliary casing and having perforating means adjacent their free ends, keys in a horizontal plane at the lower end of said upright casing and means between said keys and arms for swinging said arms to bring said perforating means thereon into registry with said second mentioned opening.

6. In a device of the class described, a main casing having a front wall with an opening, a writing sheet, means for supporting said sheet within said casing for movement across said opening, an auxiliary casing within said main casing having a front wall with a central aperture adjacent the rear of said sheet, means for vertically and laterally shifting said auxiliary casing, a question and answer enclosing form on said auxiliary casing and movable therewith, an arm pivoted to said auxiliary casing and having perforating means adapted for entering said aperture for perforating said sheet and manually controlled means for operating said arm.

7. In a device of the class described, an upright main casing having a front wall with an opening, a writing sheet, means for supporting said sheet within said casing for movement across said opening, an auxiliary casing within said upright casing having a front wall with a central aperture adjacent said writing sheet, means for vertically moving said auxiliary casing, a vertical guide bar upon said upright casing bisecting the opening and forming a question space upon one side and an answer space upon the other side, a sheet perforating member carried by said auxiliary casing and means for operating said member for perforating said sheet through said aperture.

8. In a device of the class described, an upright casing having a front wall with an opening, a writing sheet, means for supporting said sheet within said casing for movement across said opening, a vertical bar on said casing bisecting said opening for forming a question space upon one side of said bar and an answer space upon the other side with respect to said sheet, means for vertically and laterally moving said auxiliary casing, an auxiliary casing in said upright casing having a front wall with a central aperture adjacent said sheet, a paper perforating arm pivoted upon the front wall of said auxiliary casing and means for actuating said arm for perforating said sheet through said central aperture.

H VON HOBBS.
DOROTHY DELL HOBBS.

No references cited.